United States Patent [19]

Affa et al.

[11] 4,165,107

[45] Aug. 21, 1979

[54] FLEXIBLE BALL JOINT

[75] Inventors: Stephen N. Affa, Torrance; Roy E. Yorke, Granada Hills, both of Calif.

[73] Assignee: General Connectors Corporation, Burbank, Calif.

[21] Appl. No.: 853,855

[22] Filed: Nov. 22, 1977

[51] Int. Cl.$^2$ .............................................. F16L 27/04
[52] U.S. Cl. ...................................... 285/41; 285/226; 285/263
[58] Field of Search ................. 285/263, 261, 41, 226, 285/227, 166, 167, 299, 300

[56] References Cited

U.S. PATENT DOCUMENTS

| | | | |
|---|---|---|---|
| 1,155,495 | 10/1915 | Leake | 285/94 X |
| 2,502,753 | 4/1950 | Rohr | 285/166 X |
| 2,613,087 | 10/1952 | Alford | 285/261 |
| 2,712,456 | 7/1955 | McCreery | 285/226 X |
| 2,840,394 | 6/1958 | Rohr | 285/226 |
| 3,504,904 | 4/1970 | Irwin et al. | 285/263 X |
| 3,733,092 | 5/1973 | Yorke et al. | 285/166 |
| 3,901,539 | 8/1975 | Ijzerman | 285/41 |

FOREIGN PATENT DOCUMENTS

| | | | |
|---|---|---|---|
| 1234104 | 2/1967 | Fed. Rep. of Germany | 285/261 |
| 1101074 | 1/1968 | United Kingdom | 285/226 |
| 1126871 | 9/1968 | United Kingdom | 285/226 |

Primary Examiner—Thomas F. Callaghan
Attorney, Agent, or Firm—Julius Louis Rubinstein

[57] ABSTRACT

The flexible ball joint is provided with a bellows which is protectively mounted inside a shell. A portion of the shell serves as the spherical socket and a portion of a sphere serves as the ball for the ball joint. The ball is mounted in the socket and is concentric therewith. One end of the bellows is attached to the shell and the other end is attached to the ball. A plurality of generally equally angularly-spaced Purbon buttons are mounted on a support ring which is mounted on the surface of the socket. These buttons are in engagement with the surface of the ball so the ball joint can pivot freely over a wide range of temperatures. A generally spherical shell-like member is mounted in fixed and closely-spaced concentric relation to the outer surface of the spherical socket to limit axial movement between the socket and the ball and hold the Purbond button on the support ring. In addition, the shell-like member has formations shaped to define cooling channels for the protective bellows.

5 Claims, 5 Drawing Figures

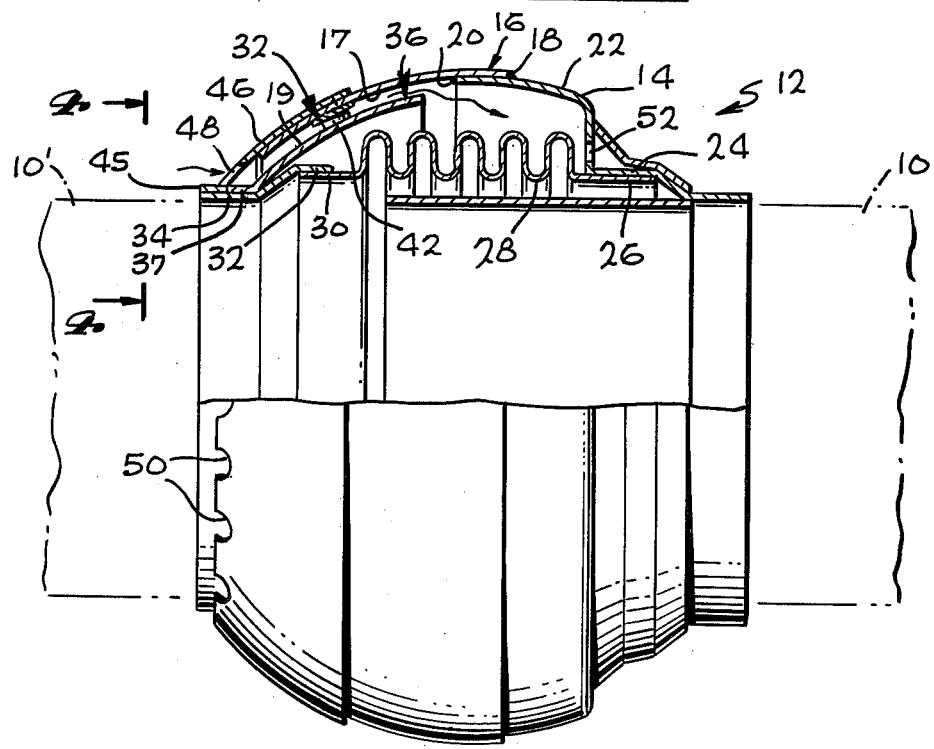
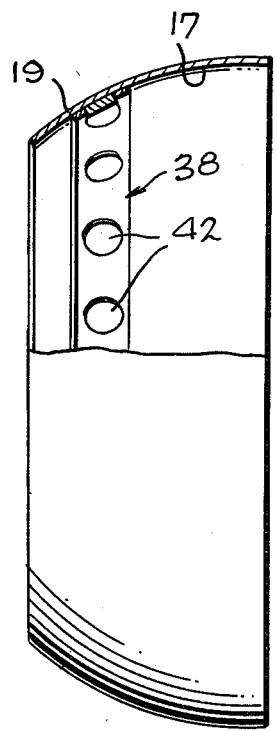
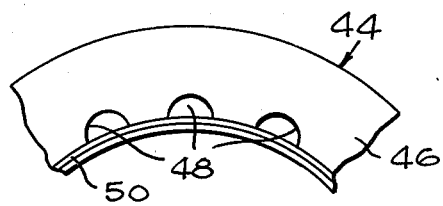
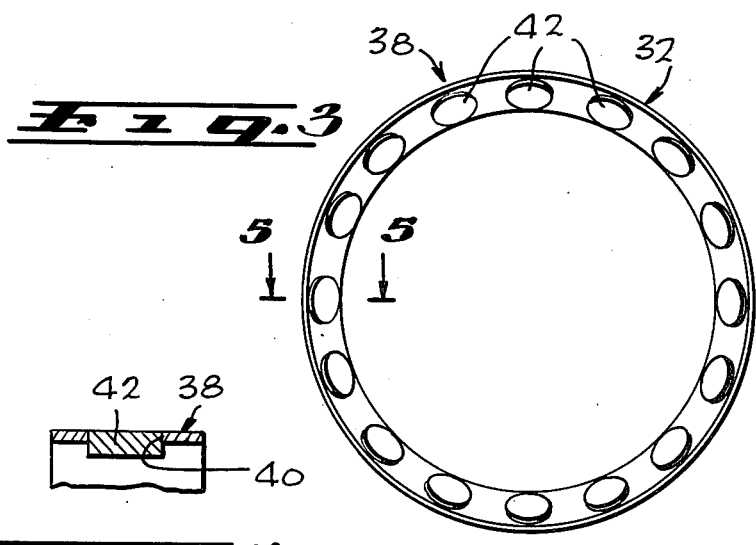

FLEXIBLE BALL JOINT

This invention relates to a flexible ball joint, and, more particularly, to a flexible ball joint for aircraft.

BACKGROUND

Flexible ball sockets have heretofore been used in ducting systems of aircraft. Typically, a bellows connection is used with the socket to provide the joint with flexible leakproof angulation, and the bellows is usually attached to the ball of the ball joint. Graphite or the like is often used to reduce friction between the ball and the socket and to reduce wear, as exemplified by the Rohr U.S. Pat. Nos. 2,840,394 and 2,502,753, the Alford U.S. Pat. No. 2,613,087, the Berry U.S. Pat. No. 1,769,905, the Gall, et al. U.S Pat. No. 1,349,060, the Murphy U.S. Pat. No. 1,925,335, the Walton U.S. Pat. No. 3,663,043, the Leak U.S. Pat. No. 1,155,495, and the Hallett U.S. Pat. No. 3,770,303.

In recent years, however, the operating temperatures of aircraft engines have increased along with their power and size. These changes in operating conditions have imposed new and more severe requirements on the ball joints. As a result, prior lubricants, such as graphite, Teflon sprays, and the like, have begun to break down, and this has increased friction and wear in the ball joint resulting in a shorter life. Another problem has arisen because the coefficient of friction of prior lubricants used in aircraft ducting has increased with temperature, making the ducting more rigid and less able to withstand vibration and acceleration and deceleration forces.

More recently, a material whose commercial name is Purbon ®, which is a treated form of graphite, has been found to have desirable low frictional properties over large extremes of operating temperatures in that its coefficient of friction tends to decrease with increasing temperature, e.g., up to the melting point of steel. This material appears to be suitable as a lubricant in flexible ball joints. However, Purbon is expensive and hard to work with, and it is desirable to use this material in an inexpensive easy-to-manufacture form.

It is also evident that aircraft design requires all parts, including flexible joints, to be as light as possible. To achieve this, the bellows is usually made very thin because in addition to being light, the thinness helps make the ball joint more flexible. However, this makes the bellows more susceptible to accidental blows or to high temperature failure which could result in a dangerous situation during flight.

What is needed, therefore, and comprises an important object of this invention, is to provide an inexpensive lightweight ball joint utilizing Purbon as the lubricant between the ball and the socket to reduce friction and insure that the ducting remains flexible over a wide range of operating temperatures.

These and other objects of this invention will become more apparent when better understood in the light of the accompanying drawings and specification wherein:

FIG. 1 is a side elevational view, partly in section, of the flexible ball joint constructed according to the principles of this invention.

FIG. 2 is a side elevational view, partly in section, showing the Purbon supporting ring mounted on the inner surface of the socket.

FIG. 3 discloses an end elevational view of the support ring with the Purbon buttons mounted thereon.

FIG. 4 is an end elevational view of a portion of the ring shaped spherical stop and protective shell used in this invention.

FIG. 5 is an enlarged sectional view taken on the line 5—5 of FIG. 4.

Referring now to FIG. 1 of the drawing, a duct indicated generally by the reference numeral 10 is connected by any suitable means to a flexible ball joint indicated generally by the reference numeral 12. The ball joint is formed in two portions. One portion comprises an outer protective shell 14. This shell is constructed in two segments for reasons of economy. One segment 16 is spherical and has a concave spherical bearing surface 17 serving as the socket of the ball joint. The spherical segment has to be constructed to a high degree of accuracy in order for the ball joint to function smoothly and without substantial friction. This type of construction is expensive and a savings in manufacturing costs is achieved in this case because the remaining segment 22 does not function as a socket, and only has to serve as a shield to protect the bellows from accidental blows. Consequently, dents in segment 22 have no effect on the function of the ball joint so it can be constructed less expensively. Segment 22 is connected to the spherical portion 16 by welds at 18 or 20 or by any other suitable means. With this arrangement, if damage or wear requires the socket to be replaced, the damaged or worn spherical segment 16 of the shell can be separated from the segment 22 and a new segment 16 substituted in its place.

The remaining portion of the protective shell 22 is stepped down to form a generally cylindrical mounting portion 24. A bellows 36 formed from an impervious material such as thin metal is provided. One end of the bellows is secured by any suitable means, such as welding, to the inner surface of the mounting portion 24, see FIG. 1. The opposite portion of the bellows is secured by any suitable means to the inner surface of a radially offset mounting portion 32. This mounting portion is stepped down at 34 to form a cylindrical support and connecting portion, which is designed to be connected to a duct 10'.

A spherical structure 36 having an attached cylindrical mounting portion 37 is rigidly secured to the cylindrical support and connecting portion 34, and has a convex bearing surface 19 serving as the ball for the ball joint 12. This ball 36 is concentric with the socket 16 and is disposed in radially inwardly closely spaced relationship thereto.

A support ring 38 is mounted on the spherical surface 17 of socket 16 by welding or any other suitable means, see FIG. 2. This support ring is provided with generally circular holes 40, which are disposed around the surface of the ring in generally uniformly angularly spaced relationship, see FIGS. 3 and 5. A plurality of Purbon buttons 42 are mounted in these holes by any suitable means, and in assembled relationship these buttons are positioned so they bear against the surface 19 of the ball 36. This arrangement prevents surface-to-surface contact between the ball and the socket with the Purbon buttons serving as the lubricant which permits the ball joint to angulate freely over a wide range of temperatures.

The surface 19 of the ball 36 is spherical, but the Purbon buttons are cylindrical in shape (about ⅛-inch in diameter and about 1/16-inch in thickness). With this arrangement, the flat circular ends of these buttons bear against the spherical surface 19. However, despite the dissimilar shapes, these buttons 42 are small enough so that the frictional resistance caused by the surface-to-surface contact between the Purbon buttons and the spherical surface of the ball is sufficiently low for the ball joint to angulate freely. Furthermore, because of the small size of the buttons, the differences in shape between the flat surface of the button and the spherical surface of the shell quickly becomes insignificant because wear on the small buttons causes the flat circular ends to become generally spherical, so they make a better fit with the spherical surface on the ball, further reducing the frictional resistance of the ball joint within a short time. The cylindrical shape of the Purbon buttons is particularly useful because it is comparatively easy and inexpensive to form small cylindrical Purbon buttons while larger and more complicated shapes formed from Purbon would be much more expensive to form. Furthermore, in case of wear, the Purbon buttons can be easily replaced because servicing would require only that the ring 38 with the worn Purbon buttons 42 be removed from the socket and replaced.

The Purbon buttons are kept in openings 40 of the ring 38 partly by a press fit and also because the buttons 42 are pressed between the socket 16 and the ball 36. The flexibility of the bellows 28, however, could permit relative axial movement between the ball 36 and the socket 16 caused by rapid acceleration or deceleration of the aircraft. This relative axial movement could increase the separation between the ball 36 and the socket 16, permitting the Purbon buttons to fall out of the support ring 38.

To prevent this from happening, a combined ring shaped stop and protective shell 44 is provided. The shell includes a cylindrical mounting portion 45 and a spherical portion 46. The shell 44 is rigidly mounted on the cylindrical mounting portion 34 by welding or any suitable means. The spherical portion 46 of shell 44 is concentric with and is in closely spaced or abutting relationship to the outer surface of the socket 16, see FIG. 1. Consequently, since the shell 44 is rigidly secured to the duct 10' and the ball 36, any relative axial movement between the ball 36 and the socket 16 in a direction which would tend to increase the separation between the ball and the socket, would force the spherical portion 46 against the outer surface of the socket 16, thus stopping the axial movement. In this way, the Purbon buttons are held in the support ring 38.

It is apparent that considerations of weight and flexibility require the bellows 28 to be as thin as possible, and to this end the bellows are protectively mounted inside the shell 22, see FIG. 1. However, high temperatures gases flowing through ducts 10 and 10' could cause the bellows to fail, releasing the hot gases inside the aircraft. This can be prevented without increasing the wall thickness of the bellows and hence increasing the weight and decreasing the flexibility of the ball joint by cooling the bellows. This is achieved by forming openings 48 at the edge 50 of the protective shield, see FIG. 4. As a result, a flow of cooling air can be directed along the duct 10' through the openings 48 of shell 46, and over the surface of the bellows 28 to cool it. Openings 52 may be formed in the shell portion 22 to provide an exit for the heated air and to provide a continuous air flow over the bellows. With this arrangement, the bellows can be made light and flexible and yet capable of withstanding high gas temperatures without failure.

Having shown and described the invention, what I claim is new is:

1. A flexible ball joint of the class described comprising a thin walled first portion adapted to be connected to a first duct and a thin walled second portion adapted to be connected to a second duct, said first and second portions connected together by a thin walled flexible bellows to prevent leakage between said first and second thin walled portions when hot gases flow through said first and second duct, said first portion being at least in part spherically concave and serving as a socket, said second portion being at least in part spherically convex and serving as a ball, said first and second portions disposed so said spherical ball nests inside said concave spherical socket so that the first and second thin walled portions can angulate freely, a thin walled ring shaped support, said support having a convex spherical outer surface and a concave spherical inner surface, said support rigidly secured to the concave surface of said first portion and in continuous engagement therewith to reinforce said first portion, a plurality of low friction buttons mounted on said support, said buttons being of the type whose coefficient of friction at least does not increase over the temperature range up to the melting point of steel, said buttons mounted on said support in such a way that a surface of the buttons bears against the convex ball to provide a low friction connection between the first and second portions to permit them to pivot freely with respect to each other over a wide range of temperatures up to the melting point of steel.

2. A flexible ball joint of the class described comprising a thin walled first portion adapted to be connected to a first duct and a thin walled second portion adapted to be connected to a second duct, said first and second portions connected together by a thin walled flexible bellows to prevent leakage between said first and second portions when hot gases flow through said first and second duct, said first portion being at least in part spherically concave and serving as a socket, said second portion being at least in part spherically convex and serving as a ball, said first and second portions disposed so said spherical ball nests inside said concave spherical socket so said first and second portions can pivot with respect to each other, a thin walled ring shaped support, said support having a convex spherical outer surface and a concave spherical inner surface, said support rigidly secured to the concave surface of said first portion and in continuous engagement therewith to reinforce said first portion with a second layer, a plurality of low friction buttons mounted on said support, said buttons being of the type whose coefficient of friction at least does not increase over a temperature range up to the melting point of steel, said buttons mounted on said support in such a way that a surface of the buttons bears against the convex ball to provide a low friction connection between the first and second portions to permit them to angulate freely with respect to each other over a wide range of temperatures up to the melting point of steel, and a combined support and stop member connected to said second portion, said combined support and stop member having a spherical portion concentric with surrounding and abutting the outer surface of said spherical socket on said first portion, both to prevent axial relative movement between said first and second portions in a direction which could separate the first and second portions far enough to permit the low friction buttons to fall out of the support, and to reinforce said spherical socket with a third layer so the socket can be formed from a thinner material.

3. A flexible ball joint of the class described comprising a thin walled first portion adapted to be connected to a first duct and a thin walled second portion adapted to be connected to a second duct, said first and second portions connected together by a thin walled flexible bellows to prevent leakage between said first and second portions when hot gases flow through said first and second duct, said first portion being at least in part spherically concave and surrounding said bellows both to serve as a protective shell to protect the bellows and to serve as a socket, said second portion being at least in part spherically convex and serving as a ball, said first and second portions disposed so said spherical ball nests inside said concave spherical socket so said first and second portions can pivot with respect to each other over said bellows, a thin walled ring shaped support, said support having a convex spherical outer surface and a concave spherical inner surface, said support rigidly secured to the concave surface of said first portion and in continuous engagement therewith to reinforce said first portion by giving the socket a second layer, a plurality of low friction buttons mounted on said support, said buttons being of the type whose coefficient of friction at least does not increase over a temperature range up to the melting point of steel, said buttons mounted on said support in such a way that a surface of the buttons bears against the convex ball to provide a low friction connection between the first and second portions to permit them to angulate freely with respect to each other over a wide range of temperatures up to the melting point of steel, a combined support and stop member connected to said first portion, said combined support and stop member having a spherical portion concentric with and abutting the outer surface of said socket both to prevent relative axial movement between said first and second portions in a direction which could separate the first and second portions far enough to permit the low friction buttons to fall out of the support and to reinforce the spherical socket with a third layer so the socket can be formed from thinner material, and openings formed in said combined support and stop member communicating both with said buttons and the outer surface of said bellows to provide ventilation to said bellows and said buttons when hot gases flow through said first and second portions.

4. A flexible ball joint of the class described comprising a thin walled first portion adapted to be connected to a first duct and a thin walled second portion adapted to be connected to a second duct, said first and second portions connected together by a thin walled flexible bellows to prevent leakage between said first and second portions when hot gases flow through said first and second ducts, said first portion formed from two attached segments, one segment having a concave spherical surface and serving as a socket, said first and second segments surrounding said bellows and serving as a protective shell, said second portion including a tubular mounting portion adapted to be mounted on said second duct and a convex spherical portion serving as a ball, said convex spherical portion nesting inside said concave spherical portion so said first and second portions can pivot with respect to each other over said bellows, a thin walled ring shaped support, said support having a convex spherical outer surface and a concave spherical inner surface, said support rigidly secured to the concave surface of said first portion and in continuous engagement therewith to reinforce said first portion by giving the socket a second layer, a plurality of low friction buttons mounted on said support, said buttons being the type whose coefficient of friction at least does not increase over a temperature range up to the melting point of steel, said buttons mounted on said support in such a way that a surface of the buttons bears against the convex ball to provide a low friction connection between the first and second portions to permit them to angulate freely over a wide range of temperatures up to the melting point of steel, a combined support and stop member having a generally tubular portion and a spherical portion, said tubular portion mounted on the tubular mounting portion of said second portion, said spherical portion concentric with and abutting the outer surface of said socket both to prevent relative axial movement between said first and second portions in a direction which could separate the first and second portions and thus permits the low friction buttons to fall out of the support and to reinforce the socket with a third layer so the socket can be formed from thinner material, the spherical portion of said combined support and stop member scalloped at the junction of said tubular portion and said spherical portion, both to reduce weight and to provide a plurality of openings communicating with said buttons and the outer surface of said bellows, whereby air can be directed through said scalloped openings over said bellows and said buttons to cool them when hot gases flow through said first and second portions.

5. A flexible ball joint of the class described comprising a thin walled first portion adapted to be connected to a first duct and a thin walled second portion adapted to be connected to a second duct, said first and second portions connected together by a thin walled flexible bellows to prevent leakage between said first and second thin walled portions when hot gases flow through said first and second duct, said first portion being at least in part spherically concave and serving as a socket, said second portion being at least in part spherically convex and serving as a ball, said first and second portions disposed so said spherical ball nests inside said concave spherical socket so that the first and second thin walled portions can angulate freely, a thin walled ring shaped support, said support having a convex spherical outer surface and a concave spherical inner surface, said support rigidly secured to a surface of one of said portions and in continuous engagement therewith to reinforce said portion, a plurality of low friction buttons mounted on said support, said buttons being of the type whose coefficient of friction at least does not increase over the temperature range up to the melting point of steel, said buttons mounted on said support in such a way that a surface of the buttons bears against one of the nesting surfaces of the ball joint ot provide a low friction connection between the first and second portions to permit them to pivot freely with respect to each other over a wide range of temperatures up to the melting point of steel.

* * * * *